(12) United States Patent
Blevins et al.

(10) Patent No.: US 7,567,180 B2
(45) Date of Patent: Jul. 28, 2009

(54) FACILITATING MEDICAL EMERGENCY ASSISTANCE

(76) Inventors: Daniel Allen Blevins, 55 Amsonia Ct., Stafford, VA (US) 22556; Christine Blevins, 55 Amsonia Ct., Stafford, VA (US) 22556

( * ) Notice: Subject to any disclaimer, the term of this patent is extended or adjusted under 35 U.S.C. 154(b) by 575 days.

(21) Appl. No.: 11/322,022

(22) Filed: Dec. 29, 2005

(65) Prior Publication Data

US 2007/0154873 A1 Jul. 5, 2007

(51) Int. Cl.
*G08B 23/00* (2006.01)

(52) U.S. Cl. .................. 340/573.1; 607/5; 340/539.12; 434/262

(58) Field of Classification Search ............. 340/573.1, 340/539.18, 825.49, 825.36, 539.12; 434/262, 434/365, 142; 600/509, 523; 607/5, 6, 7, 607/8, 10
See application file for complete search history.

(56) References Cited

U.S. PATENT DOCUMENTS

| | | | |
|---|---|---|---|
| 4,863,385 A * | 9/1989 | Pierce | 434/265 |
| 5,189,632 A | 2/1993 | Paajanen et al. | |
| 5,913,685 A * | 6/1999 | Hutchins | 434/265 |
| 6,078,803 A | 6/2000 | Fernandez Martinez | |
| 6,334,070 B1 * | 12/2001 | Nova et al. | 607/5 |
| 6,459,933 B1 * | 10/2002 | Lurie et al. | 607/5 |
| 6,865,418 B2 * | 3/2005 | Merry | 607/5 |
| 6,872,080 B2 * | 3/2005 | Pastrick et al. | 434/262 |
| 7,277,752 B2 * | 10/2007 | Matos | 607/5 |
| 7,289,029 B2 * | 10/2007 | Medema et al. | 340/573.1 |

* cited by examiner

*Primary Examiner*—Anh V La
(74) *Attorney, Agent, or Firm*—Raymond M. Galasso; David O. Simmons; Galasso & Associates, L.P.

(57) ABSTRACT

In another embodiment of the present invention, an medical emergency assistance apparatus comprises a visual display, an audible output device, a telephonic input device, medical emergency assistance situation options, a device selecting a desired one of the medical emergency assistance situation options, medical emergency assistance instructions and at least one emergency assistance call selector. The medical emergency assistance situation options are outputtable via at least one of the visual display and the audible output device. The medical emergency assistance instructions are outputtable via the visual display and the audible output device in response to selection of the desired one of the emergency assistance situation options. The medical emergency assistance instructions correspond to the desired one of the emergency assistance situation options. The at least one emergency assistance call selector whose selection initiates a connection with a prescribed telephone number being established such that two-way communication with a remotely located party via the audible output device and the telephonic input device is enabled.

20 Claims, 3 Drawing Sheets

FACILITATING MEDICAL EMERGENCY ASSISTANCE

FIELD OF THE DISCLOSURE

The disclosures made herein relate generally to apparatuses and methods for administering medical emergency assistance and, more particularly, to apparatuses configured for audibly and/or visually providing information needed to render medical emergency assistance.

BACKGROUND

In the event of a medical emergency situation, responding as quickly as possible is crucial to limiting adverse outcome of the situation for a victim. Furthermore, when administering medical emergency assistance, it is very important to use proper medical procedures and techniques. Medical emergency situations give rise to unnecessary adverse results when an untrained individual that is responding to the situation does not have immediate and effective access to information relating to proper techniques, assistance and/or equipment required for such medical emergency situation.

It is quite common for a person to call 911, a poison control center or medical professional in the case of a medical emergency situation. The trained professional answering such calls are generally able to provide valuable information that may be critical to the life of the victim. However, the person answering the call is able to audibly, but not visually, provide such information. The likelihood is that the untrained individual rendering assistance will be nervous or in a state of panic, which adds to the difficulty of the trained professional being able to coach them through a situation with only an audible means to do so.

Therefore, a medical emergency assistance system that enables medical emergency assistance information to be provided audibly and visually to a person rendering medical emergency assistance is useful.

SUMMARY OF THE DISCLOSURE

Embodiments of the present invention provide a convenient and effective means for assisting a person in aiding another person or pet (i.e., victim) during a medical emergency situation. More specifically, embodiments of the present invention provide audibly and visually outputted medical emergency assistance information that is specific to a given medical emergency. A portable user-friendly apparatus is configured for audibly and visually outputting such medical emergency assistance information. In doing so, embodiments of the present invention advantageously overcome one or more unmet needs associated with conventional approaches for offering emergency-specific information to an untrained professional in an medical emergency situation.

In one embodiment of the present invention, a method for facilitating medical emergency assistance functionality comprises a plurality of operations. An operation is performed for outputting medical emergency situation options from a portable electronic medical emergency assistance apparatus. After outputting at least a portion of the medical emergency situation options, an operation is performed for receiving a selection signal for a chosen one of the medical emergency situation options. The portable electronic medical emergency assistance apparatus performs receiving of the selection signal. In response to receiving a chosen one of the medical emergency situation options, an operation is performed for outputting medical emergency assistance instructions from the portable electronic medical emergency assistance apparatus. The medical emergency assistance instructions correspond to the chosen one of the medical emergency situation options.

In another embodiment of the present invention, an medical emergency assistance apparatus comprises a visual display, an audible output device, a telephonic input device, medical emergency assistance situation options, means for selecting a desired one of the medical emergency assistance situation options, medical emergency assistance instructions and at least one emergency assistance call selector. The medical emergency assistance situation options are outputtable via at least one of the visual display and the audible output device. The medical emergency assistance instructions are outputtable via the visual display and the audible output device in response to selection of the desired one of the emergency assistance situation options. The medical emergency assistance instructions correspond to the desired one of the emergency assistance situation options. The at least one emergency assistance call selector whose selection initiates a connection with a prescribed telephone number being established such that two-way communication with a remotely located party via the audible output device and the telephonic input device is enabled.

In another embodiment of the present invention, a medical emergency assistance system comprises a base station and a portable electronic medical emergency assistance apparatus. The base station includes a cordless telephone signal transceiver. The portable electronic medical emergency assistance apparatus includes a cordless telephone signal transceiver, at least one data processing device, memory coupled to the at least one data processing device and instructions accessible from the memory and processable by the at least one data processing device. The cordless telephone signal transceiver of the portable electronic medical emergency assistance apparatus is configured for transmitting signals to and receiving signals from the cordless telephone signal transceiver of the base station. The instructions are configured for enabling the at least one data processing device to facilitate outputting medical emergency situation options, receiving a selection signal for a chosen one of the medical emergency situation options after outputting at least a portion of the medical emergency situation options and outputting medical emergency assistance instructions corresponding to the chosen one of the medical emergency situation options in response to receiving the selection signal. Performing the instructions is initiated in response to removing the portable electronic medical emergency assistance apparatus from the base station.

Turning now to specific aspects of the present invention, in at least one embodiment, outputting the medical emergency situation options is performed automatically in response to removing the portable electronic medical emergency assistance apparatus from a base station.

In at least one embodiment of the present invention, outputting the medical emergency situation options includes audibly outputting the medical emergency situation options.

In at least one embodiment of the present invention, outputting the cal emergency situation options includes visually outputting the medical emergency situation options synchronously with the audibly outputted medical emergency situation options and the visually outputted medical emergency situation options contextually correspond to the audibly outputted medical emergency situation options.

In at least one embodiment of the present invention, outputting the cal emergency situation options includes outputting groupings of medical emergency situation options and the groupings of medical emergency situation options includes a first grouping of medical emergency situation options typically associated with persons of a first category and a second grouping of medical emergency situation options typically associated with persons of a second category.

In at least one embodiment of the present invention, outputting the emergency instructions includes audibly outputting the medical emergency instructions.

In at least one embodiment of the present invention, outputting the cal emergency instructions includes visually outputting the medical emergency instructions synchronously with the audibly outputted medical emergency instructions and the visually outputted medical emergency instructions contextually correspond to the audibly outputted medical emergency instructions.

In at least one embodiment of the present invention, an operation is performed for receiving an emergency assistance call request signal and establishing connection with an prescribed phone number in response to receiving the emergency assistance call request signal.

In at least one embodiment of the present invention, an operation is performed for terminating outputting of the medical emergency assistance instructions in response to one of the receiving the emergency assistance call request signal and the establishing connection being performed.

In at least one embodiment of the present invention, the medical emergency assistance situation options are visually outputted via the visual display and the audible output device; and the means for selecting the desired one of the medical emergency assistance situation options includes a first selector for moving a selection identifier through the visually outputted medical emergency assistance situation options and a second selector for accepting the selected one of the medical emergency assistance situation options.

In at least one embodiment of the present invention, exterior electrical contacts configured for being engaged by mating electrical contacts of a base station are provided.

In at least one embodiment of the present invention, an apparatus cordless telephone signal transceiver configured for transmitting signals to and receiving signals from a base station cordless telephone signal transceiver and two-way communication with the remotely located party is facilitated through the apparatus cordless telephone signal transceiver.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
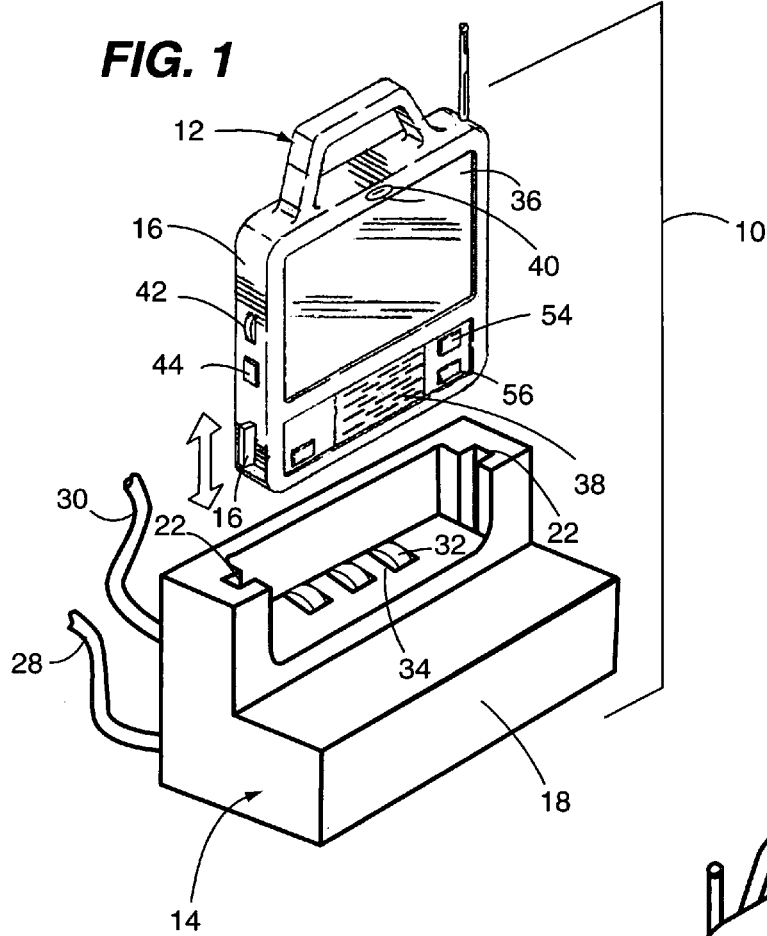
FIG. 1 depicts an embodiment of a medical emergency assistance system in accordance with the present invention, which includes a portable electronic medical assistance apparatus and a base station.
Figure 2:
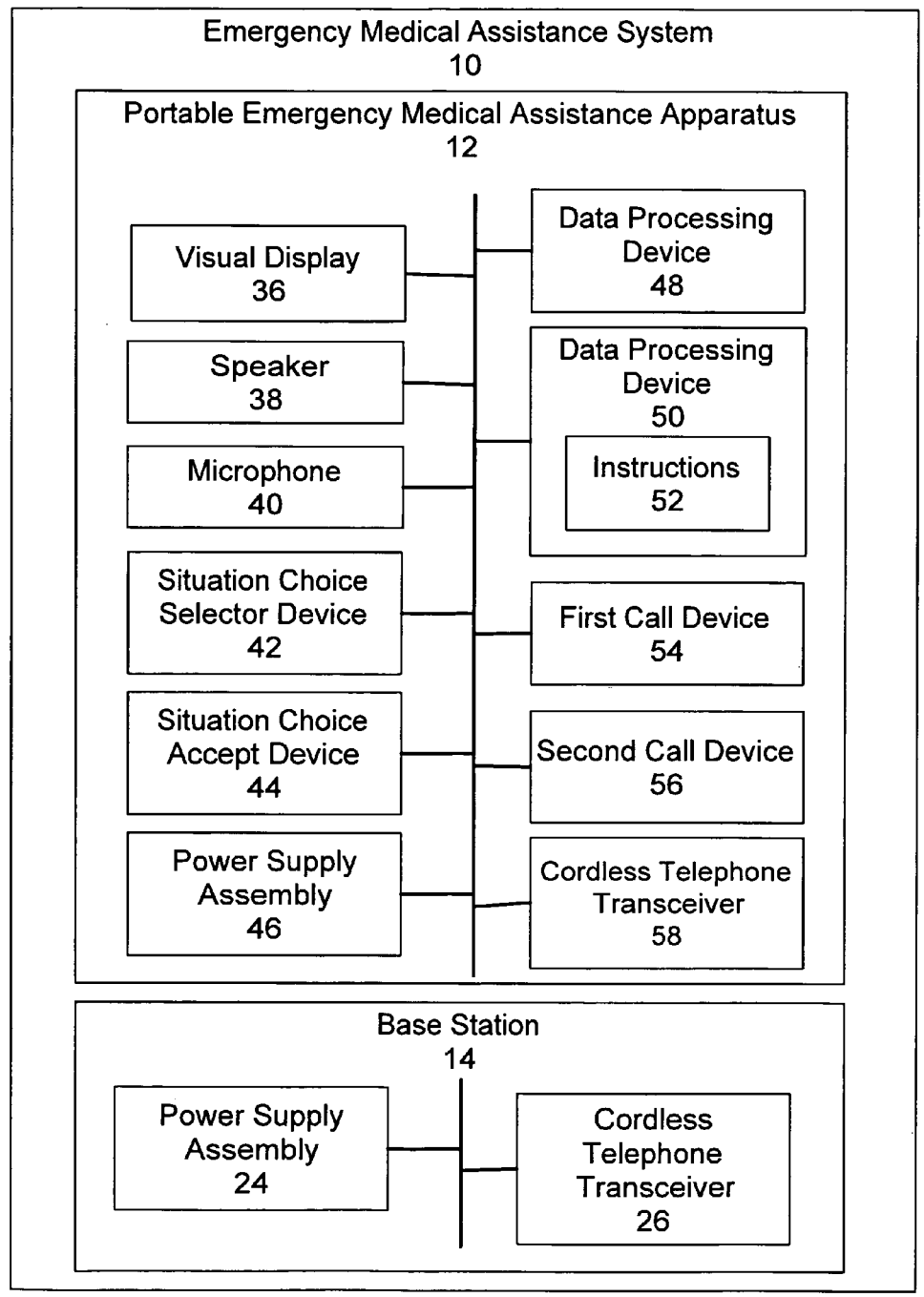
FIG. 2 is a block diagram of functional components of a medical emergency assistance system in accordance with the present invention.

FIGS. 1 and 2 depict an embodiment of a medical emergency assistance system in accordance with the present invention, which is referred to herein the medical emergency assistance system 10. The medical emergency assistance system 10 comprises a portable electronic medical emergency assistance apparatus 12 (i.e., apparatus 12) and a base station 14. As is discussed below in greater detail, the apparatus 12 and a base station 14 interact for providing medical emergency assistance functionality in accordance with the present invention.

As depicted in FIG. 1, the apparatus 12 includes a housing 16 (i.e., the apparatus housing 16) and the base station includes a housing 18 (i.e., the base station housing 18). The apparatus housing 16 is removably engagable with (e.g., mountable on) the base station housing 18. The apparatus housing 16 includes raised portions 20 (i.e., alignment features) that engaged mating channels 22 of the base station housing 18, thereby securely and positively positioning the apparatus housing 16 with respect to the base station housing 18.

As depicted in FIG. 2, the base station 14 includes a power supply assembly 24 and a cordless telephone transceiver 26. The power supply assembly 24 and the cordless telephone transceiver are interconnected either directly or indirectly for enabling power to be provided to the cordless telephone transceiver 26. The components of the base station 14 depicted in FIG. 2 are not intended to illustrate all components that the base station 14 includes, but rather the general components of the base station 14 that enable medical emergency assistance functionality in accordance with the present invention.

Referring now to FIGS. 1 and 2, the power supply assembly 24 and the cordless telephone transceiver 26 of the base station 14 are housed within the base station housing 18. Power is provided to the power supply assembly 24 via a power cable 28 (FIG. 1), such as that having a plug configured for being plugged into a line current electrical outlet or that connected to a power converter. In the case where in the power cable 28 is connected directly to a line current electrical outlet, the power supply assembly 24 will include a power converter, power transformer or both. Telecommunication connectivity is provided to the cordless telephone transceiver 26 via a telecommunication cable 30 (FIG. 1), such as that configured for being plugged into a telecommunication outlet. The power supply assembly 24 includes a plurality of electrical contacts 32 (FIG. 1) that are expose within respective openings 34 of the base station housing 18. The plurality of electrical contacts 32 serve as a means for providing power (e.g., direct current power) to the apparatus 12.

Referring now to FIGS. 1 and 2, the apparatus 12 includes a visual display 36, a speaker 38, a microphone 40, a situation choice selector device 42, a situation choice accept device 44, a power supply assembly 46, a data processing device 48, memory 50 having instructions 52 accessible therefrom, a first call number selector device 54, a second call number selector device 56 and a cordless telephone transceiver 58. The visual display 36, the speaker 38, the microphone 40, the situation choice selector device 42, the situation choice accept device 44, the power supply assembly 46, the data processing device 48, the memory 50, the first call number selector device 54, the second call number selector device 56 and the cordless telephone transceiver 58 are interconnected for either directly or indirectly for enabling associated functionalities and are attached to the apparatus housing 16. The components of the apparatus 12 depicted in FIG. 2 are not intended to illustrate all components that the apparatus 12 includes, but rather the general components of the apparatus 12 that enable medical emergency assistance functionality in accordance with the present invention.

Figure 3:
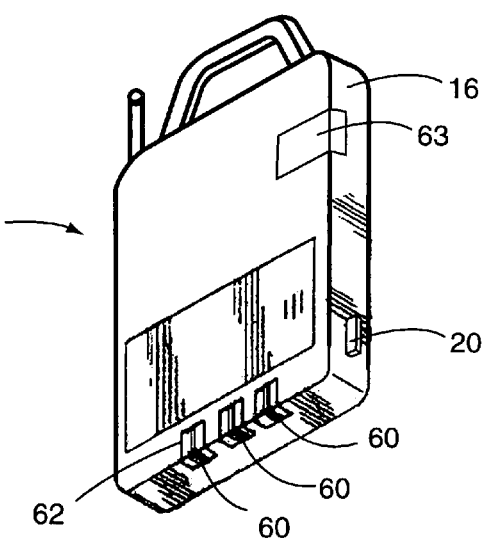
FIG. 3 is a rear view of the portable electronic medical assistance apparatus shown in FIG. 1.

As depicted in FIG. 3, the power supply assembly 46 of the apparatus 12 includes a plurality of electrical contacts 60 that are expose within respective openings 62 of the apparatus housing 16 and one or more rechargeable batteries (not specifically shown) connected to the of electrical contacts 60. The plurality of electrical contacts 32 are positioned such that they each contact a respective one of the electrical contacts 32 of the base station 14. In this manner, power from the power supply assembly 24 of the base station 14 is conducted to the power supply assembly 46 of the apparatus 12 through the electrical contacts (32, 60) for maintaining the rechargeable battery or batteries of the apparatus 12 in a charged state while the apparatus 12 is mounted on the base station 14 and while the base station 14 is connected to a suitable power source (e.g., a line current electrical outlet).

The cordless telephone signal transceiver 58 of the apparatus 12 is configured for transmitting signals to and receiving signals from the cordless telephone signal transceiver 26 of the base station 14. In this manner, the apparatus 12 and the base station 14 are jointly configured for facilitating conventional cordless phone communication functionality (i.e., communication of voice signal between the apparatus 12 and the base station 14). The present invention is not necessarily limited to a particular configuration of cordless telephone signal transceiver. Various types of known cordless telephone signal transceivers will provide required functionality.

The instructions 52 of the apparatus 12 are configured for enabling medical emergency assistance functionality in accordance with the present invention to be facilitated. More specifically, the instructions 52 are the logical instructions by which medical emergency assistance functionality in accordance with the present invention is carried out. As will be discussed in greater detail below, the method 100 discussed in reference to FIG. 4 embodies medical emergency assistance functionality in accordance with the present invention.

The memory 50, from which the instructions 52 are accessible, is coupled to the data processing device 48. The instructions 52 are accessible from the memory 50 and are processable by the data processing device 48. Performing of the instructions 52 is initiated in response to removing the apparatus 12 from the base station 14. For example, the removal of an applied voltage to the electrical contacts 60 of the apparatus 12 initiates performing of the instructions 52.

It is disclosed herein that memory 50 may be a removable memory device (e.g., mounted on or mounted behind memory device cover 64 in FIG. 3). Implementation of such a removable memory device allows the instructions 52 to be changed or upgraded by replacing the removable memory device. Different removable memory devices would have different (e.g., upgraded) instructions residing thereon.

Figure 4:
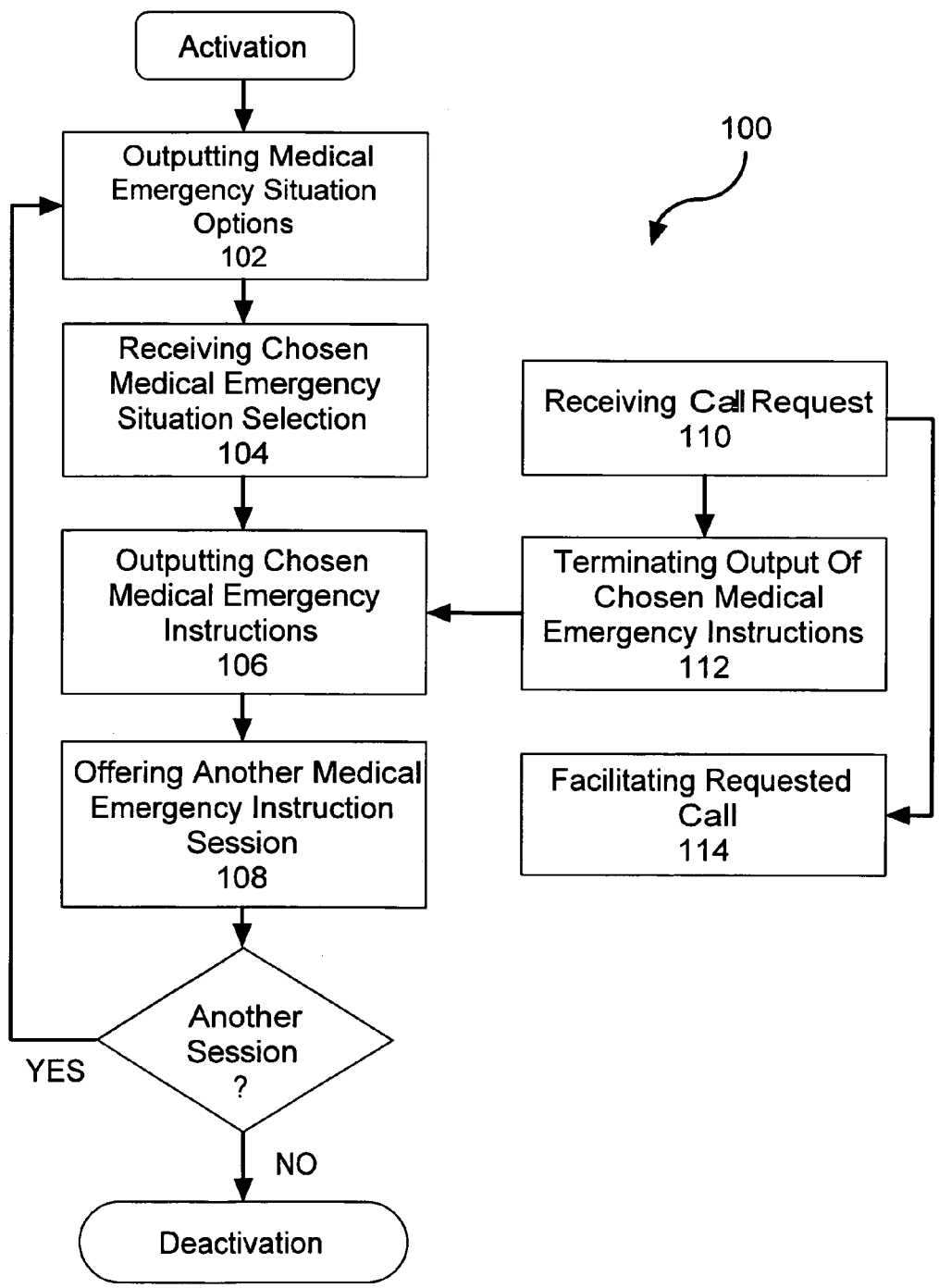
FIG. 4 depicts an embodiment of a method for facilitating medical emergency assistance in accordance with the present invention.

FIG. 4 depicts an embodiment of a method for facilitating medical emergency assistance functionality in accordance with the present invention, which is referred to herein as the method 100. The apparatus 12 discussed in reference to FIGS. 1-3 is an example of an apparatus suitable configured for carrying out the method 100. However, embodiments of methods for facilitating medical emergency assistance functionality in accordance with the present invention are not limited specifically to the apparatus 12 discussed in reference to FIGS. 1-3. A skilled person will appreciate that other embodiments of electronic medical emergency assistance apparatuses in accordance of the present invention may be suitable configured for carrying out methods for facilitating medical emergency assistance functionality in accordance with the present invention.

The method 100 comprises a plurality of related operations for carrying out such medical emergency assistance functionality. The medical emergency assistance functionality resulting from such operations being performed provides a convenient and effective means for assisting a person in aiding another person or pet (i.e., victim) during a medical emergency situation. In doing so, the method 100 advantageously overcomes one or more unmet needs associated with conventional approaches for offering emergency-specific information to an untrained professional in an medical emergency situation.

In response to activation of the apparatus 12 being removed from the base station 14, the method 100 is initiated (i.e., medical emergency assistance functionality in accordance with the present invention is activated). Accordingly, the data processing device 48 performs an operation 102 for outputting medical emergency situation options. Preferably, one embodiment of activation includes the apparatus 12 being automatically activated in response to being removed from the base station 14. For example, the apparatus 12 being is automatically activated upon disengagement of power supply assembly contacts (32, 60) between the apparatus 12 and the base station 14.

Preferably, outputting of medical emergency situation options includes audibly outputting the medical emergency situation options, visually outputting the medical emergency instruction or both. Where the medical emergency situation options are both audibly and visually outputted, the visually outputted medical emergency situation options are outputted synchronously (i.e., in concert with) with the audibly outputted medical emergency situation options and the visually outputted medical emergency situation options contextually correspond (i.e., providing visual augmentation) to the audibly outputted medical emergency situation options. Furthermore, the dual mode output will aid in delivery of the options as the person to whom they are delivered will often times be in a state of nervousness, panic or shock.

Examples of medical emergency situation options include, but are not limited to poison, heart attack, choking, unconscious, stroke, bleeding, broken bone, snake bite, contusion, insect bite, animal bite, chemical/drug overdose and the like. It is disclosed herein that the medical emergency situation options may be grouped according to different victim categories (e.g., age, race, gender, etc,) as different medical emergency situation instructions or details thereof may apply to different groups of victims. Accordingly, in one embodiment of the present invention, the medical emergency situation options are selectively outputted in related groupings of options that each correspond to a particular category of victim.

After outputting at least a portion of the medical emergency situation options, the data processing device 48 performs an operation 104 for receiving a selection signal for a chosen one of the medical emergency situation options. The signal corresponds to a medical emergency situation option that an operator of the apparatus has chosen (i.e., highlighted on a list and accepted that selection). The situation choice selector device 42 (FIG. 2) includes an exposed knob 43 used for selecting a desired one of the displayed medical emergency situation options and the situation choice accept device 44 includes an exposed button 45 for confirming the selection (i.e., entering the selection). Optionally, the visual display 36 may be a touch-screen type display and the desired one of the displayed medical emergency situation options may be selected by touching the screen at a location corresponding to the desired one of the displayed medical emergency situation options.

The data processing device 48 performs an operation 106 for outputting medical emergency assistance instructions from the apparatus in response to receiving the selection signal. The medical emergency assistance instructions correspond to the chosen one of the medical emergency situation options. In the case where the medical emergency situation options are selectively outputted in related groupings (e.g., selection of age first, then gender, then situation), a selection signal corresponds to each one of the groupings. But, it is the selection signal for the medical emergency situation option itself (i.e., the victim's ailment) that triggers outputting of the medical emergency assistance instructions.

Preferably, outputting of medical emergency assistance instructions includes audibly outputting the medical emergency situation options and visually outputting the medical emergency instruction. Provisions such as a rewind or replay options may be provided for enabling a person operating the apparatus. Such a provision allows all or a portion of the medical emergency assistance instructions to be outputted one or more times after an initial output.

The visually outputted medical emergency assistance instructions are outputted synchronously (i.e., in concert with) with the audibly outputted medical emergency assistance instructions and the visually outputted medical emergency assistance instructions contextually correspond (i.e., providing visual augmentation) to the audibly outputted medical emergency assistance instructions. In view of the synchronous and contextual output of the audibly and visually medical emergency assistance instructions, a far more detailed explanation of potentially life saving information may be provided as opposed to the information being outputted only visually or audibly.

After the medical emergency assistance instructions are outputted, the data processing device 48 performs an operation 108 for offering another medical emergency instructions session. In response to another session being requested, the method 100 continues at the operation 102 for outputting medical emergency situation options. Otherwise, the method 100 terminates and is reset after the apparatus 12 is placed on the base station 14 or a resetting button (e.g., the button 45 of the situation choice accept device 44) is depressed.

Before, during or after the output of the medical emergency assistance instructions, the person operating the apparatus 12 may utilize the apparatus 12 for facilitating a call to speak with trained emergency personnel. The first call number selector device 54 includes an exposed button 55 and the second call number selector device 56 includes an exposed button 57. Depression of either button initiates connection to a programmed telephone number associated with the respective button.

In response to depression of the button of a respective one of the call number selector devices (54, 56), the data processing device 48 performs an operation 110 for receiving a call request signal transmitted from the respective one of the call number selector devices (54, 56). The call request signal represents a request for establishing a connection between the apparatus 12 and a telephone number (e.g., 911 or other pre-programmed number) associated with the respective one of the call number selector devices (54, 56). In response to receiving the call request, the data processing device 48 performs an operation 112 for terminating outputting of the medical emergency assistance instructions and the data processing device 48 performs an operation 114 for facilitating connection to the telephone number associated with the respective one of the call number selector devices (54, 56). Optionally, outputting of the medical emergency assistance instructions may be terminated in response to the connection to the telephone number associated with the respective one of the call number selector devices (54, 56) being established.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating medical emergency assistance functionality, comprising:

removing a portable electronic medical emergency assistance apparatus from a base station thereby activating the portable electronic medical assistance apparatus;

outputting medical emergency situation options from the portable electronic medical emergency assistance apparatus;

receiving a selection signal for a chosen one of said medical emergency situation options after outputting at least a portion of said medical emergency situation options, wherein said receiving is performed by the portable electronic medical emergency assistance apparatus;

outputting medical emergency assistance instructions from the portable electronic medical emergency assistance apparatus in response to receiving the selection signal, wherein said medical emergency assistance instructions correspond to the chosen one of said medical emergency situation options.

2. The method of claim 1 wherein said outputting medical emergency situation options is performed automatically in response to removing the portable electronic medical emergency assistance apparatus from the base station.

3. The method of claim 1 wherein said outputting medical emergency situation options includes audibly outputting said medical emergency situation options.

4. The method of claim 3 wherein:

said outputting medical emergency situation options includes visually outputting said medical emergency situation options synchronously with said audibly outputted medical emergency situation options; and said visually outputted medical emergency situation options contextually correspond to said audibly outputted medical emergency situation options.

5. The method of claim 1 wherein:

said outputting medical emergency situation options include outputting groupings of medical emergency situation options; and said groupings of medical emergency situation options includes a first grouping of medical emergency situation options typically associated with persons of a first category and a second grouping of medical emergency situation options typically associated with persons of a second category.

6. The method of claim 1 wherein said outputting medical emergency instructions includes audibly outputting said medical emergency instructions.

7. The method of claim 6 wherein:
said outputting medical emergency instructions includes visually outputting said medical emergency instructions synchronously with said audibly outputted medical emergency instructions; and
said visually outputted medical emergency instructions contextually correspond to said audibly outputted medical emergency instructions.

8. The method of claim 1 wherein said outputting medical emergency instructions includes visually outputting said medical emergency instructions.

9. The method of claim 1, further comprising:
receiving an emergency assistance call request signal; and
establishing connection with a prescribed phone number in response to receiving the emergency assistance call request signal.

10. The method of claim 9, further comprising:
terminating said outputting of medical emergency assistance instructions in response to one of said receiving the emergency assistance call request signal and said establishing connection being performed.

11. The method of claim 1, further comprising:
receiving an emergency assistance call request signal;
establishing connection with a prescribed phone number in response to receiving the emergency assistance call request signal; and
terminating said outputting of medical emergency assistance instructions in response to one of said receiving the emergency assistance call request signal and said establishing connection being performed;
wherein said outputting medical emergency situation options is performed automatically in response to removing the portable electronic medical emergency assistance apparatus from the base station;
wherein said outputting medical emergency situation options includes audibly outputting said medical emergency situation options and visually outputting said medical emergency situation options synchronously with said audibly outputted medical emergency situation options;
wherein said visually outputted medical emergency situation options contextually correspond to said audibly outputted medical emergency situation options;
wherein said outputting medical emergency situation options includes outputting groupings of medical emergency situation option;
wherein said groupings of medical emergency situation options includes a first grouping of medical emergency situation options typically associated with persons of a first age range and a second grouping of medical emergency situation options typically associated with persons of a second age range;
wherein said outputting medical emergency instructions includes audibly outputting said medical emergency instructions and visually outputting said medical emergency instructions synchronously with said audibly outputted medical emergency instructions; and
wherein said visually outputted medical emergency instructions that contextually correspond to said audibly outputted medical emergency instructions.

12. An medical emergency assistance apparatus, comprising:
a base; said base further comprising a power supply assembly, cordless telephone receiver and mating channels;
a housing comprising alignment features that engage with the mating channels of the base;
a visual display;
an audible output device;
a telephonic input device;
medical emergency assistance situation options output table via at least one of the visual display and the audible output device;
means for selecting a desired one of said medical emergency assistance situation options;
medical emergency assistance instructions output table via the visual display and the audible output device in response to selection of the desired one of said emergency assistance situation options, wherein said medical emergency assistance instructions correspond to the desired one of said emergency assistance situation options; and
at least one emergency assistance call selector whose selection initiates a connection with a prescribed telephone number being established such that two-way communication with a remotely located party via the audible output device and the telephonic input device is enabled.

13. The medical emergency assistance apparatus of claim 12 wherein:
said medical emergency assistance situation options are visually outputted via the visual display and the audible output device; and
said means for selecting the desired one of said medical emergency assistance situation options includes a first selector for moving a selection identifier through said visually outputted medical emergency assistance situation options and a second selector for accepting the selected one of said medical emergency assistance situation options.

14. The medical emergency assistance apparatus of claim 13, further comprising:
exterior electrical contracts configured for being engaged by mating electrical contacts of a base station; and
an apparatus cordless telephone signal transceiver configured for transmitting signals to and receiving signals from a base station cordless telephone signal transceiver, wherein said two-way communication with the remotely located party is facilitated through the apparatus cordless telephone signal transceiver.

15. An medical emergency assistance system, comprising:
a base station including a cordless telephone signal transceiver, a power supply and mating channels; wherein said base station is powered by a power supply assembly via a power cable;
a portable electronic medical emergency assistance apparatus including a cordless telephone signal transceiver, at least one data processing device, a removable memory device coupled to said at least one data processing device and instructions accessible from said memory device and processable by said at least one data processing device and a housing which includes alignment features for engaging with the mating channels of the base station;
wherein the cordless telephone signal transceiver of the portable electronic medical emergency assistance apparatus is configured for transmitting signals to and receiving signals from the cordless telephone signal transceiver of the base station;

wherein said instructions are configured for enabling said at least one data processing device to facilitate outputting medical emergency situation options, receiving a selection signal for a chose one of said medical emergency situation options after outputting at least a portion of said medical emergency situation options and outputting medical emergency assistance instructions corresponding to the chose one of said medical emergency situation options in response to receiving the selection signal;

wherein performing of said instructions is initiated in response to removing the portable electronic medical emergency assistance apparatus from the base station; and wherein said removable memory device allows the instructions to be changed or upgraded.

16. The system of claim 15 wherein:

said outputting medical emergency situation options includes audibly outputting said medical emergency situation options and visually outputting said medical emergency situation options synchronously with said audibly outputted medical emergency situation options; and said visually outputted medical emergency situation options contextually correspond to said audibly outputted medical emergency situation options.

17. The system of claim 16 wherein:

said outputting medical emergency situation options includes outputting groupings of medical emergency situation options; and said groupings of medical emergency situation options includes a first grouping of medical emergency situation options typically associated with persons of a first category and a second grouping of medical emergency situation options typically associated with persons of a second category.

18. The system of claim 17 wherein:

said outputting medical emergency instructions includes audibly outputting said medical emergency instructions and visually outputting said medical emergency instructions synchronously with said audibly outputted medical emergency instructions; and said visually outputted medical emergency instructions contextually correspond to said audibly outputted medical emergency instructions.

19. The system of claim 18, further comprising:

receiving an emergency assistance all request signal; and establishing connection with an prescribed phone number in response to receiving the emergency assistance call request signal.

20. The system of claim 19, further comprising:

terminating said outputting of medical emergency assistance instructions in response to one of said receiving the emergency assistance call request signal and said establishing connection.

* * * * *